(12) United States Patent
Kim et al.

(10) Patent No.: US 12,209,656 B2
(45) Date of Patent: Jan. 28, 2025

(54) ELECTRONIC SHIFT CONTROL APPARATUS

(71) Applicants: Hyundai Motor Company, Seoul (KR); Kia Corporation, Seoul (KR)

(72) Inventors: Yeong Jik Kim, Seoul (KR); Pill Yoon Kim, Uiwang-Si (KR); Jae Yeon Yu, Hwaseong-Si (KR); Jee Hyuck Choi, Yongin-Si (KR); Jae Min Park, Namyangju-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/220,109

(22) Filed: Jul. 10, 2023

(65) Prior Publication Data

US 2024/0271697 A1 Aug. 15, 2024

(30) Foreign Application Priority Data

Feb. 13, 2023 (KR) .................. 10-2023-0018749

(51) Int. Cl.
| | | |
|---|---|---|
| *F16H 59/10* | (2006.01) | |
| *B60K 20/06* | (2006.01) | |
| *F16H 57/02* | (2012.01) | |
| *F16H 59/02* | (2006.01) | |
| *F16H 63/42* | (2006.01) | |

(52) U.S. Cl.
CPC ........... *F16H 59/105* (2013.01); *B60K 20/06* (2013.01); *F16H 57/02* (2013.01); *F16H 2057/02034* (2013.01); *F16H 2057/02082* (2013.01); *F16H 2059/026* (2013.01); *F16H 2063/423* (2013.01)

(58) Field of Classification Search
CPC .................. F16H 59/105; F16H 57/02; F16H 2057/02034; F16H 2057/02082; F16H 2059/026; F16H 2063/423; B60K 20/06
See application file for complete search history.

(56) References Cited

U.S. PATENT DOCUMENTS

| | | | |
|---|---|---|---|
| 4,537,088 | A | 8/1985 | Kubota |
| 2009/0120222 | A1 | 5/2009 | Kimura et al. |
| 2019/0178368 | A1* | 6/2019 | Elberling ............ F16H 59/0278 |
| 2021/0095756 | A1 | 4/2021 | Mendoza-Vega et al. |
| 2021/0365063 | A1* | 11/2021 | Choi ...................... F16H 59/12 |

FOREIGN PATENT DOCUMENTS

| | | |
|---|---|---|
| JP | 2015-218898 | 12/2015 |
| KR | 10-2019-0024478 | 3/2019 |
| KR | 10-2019-0134927 | 12/2019 |
| KR | 10-2021-0114732 | 9/2021 |
| KR | 10-2021-0138956 | 11/2021 |
| KR | 10-2022-0065468 | 5/2022 |
| KR | 10-2022-0093919 | 7/2022 |
| KR | 10-2022-0144418 | 10/2022 |

\* cited by examiner

*Primary Examiner* — Terence Boes
(74) *Attorney, Agent, or Firm* — Morgan, Lewis & Bockius LLP

(57) ABSTRACT

A column-type electronic shift control apparatus is mounted in a rotation type on a steering column of a vehicle and in which a shifter is positioned to extend upward in a standby mode and is positioned to extend laterally in a use mode by rotating from the standby mode ahead of the steering wheel in the visual field of a driver, and when necessary, it is possible to shift by operating the shifter even in the standby mode.

20 Claims, 9 Drawing Sheets

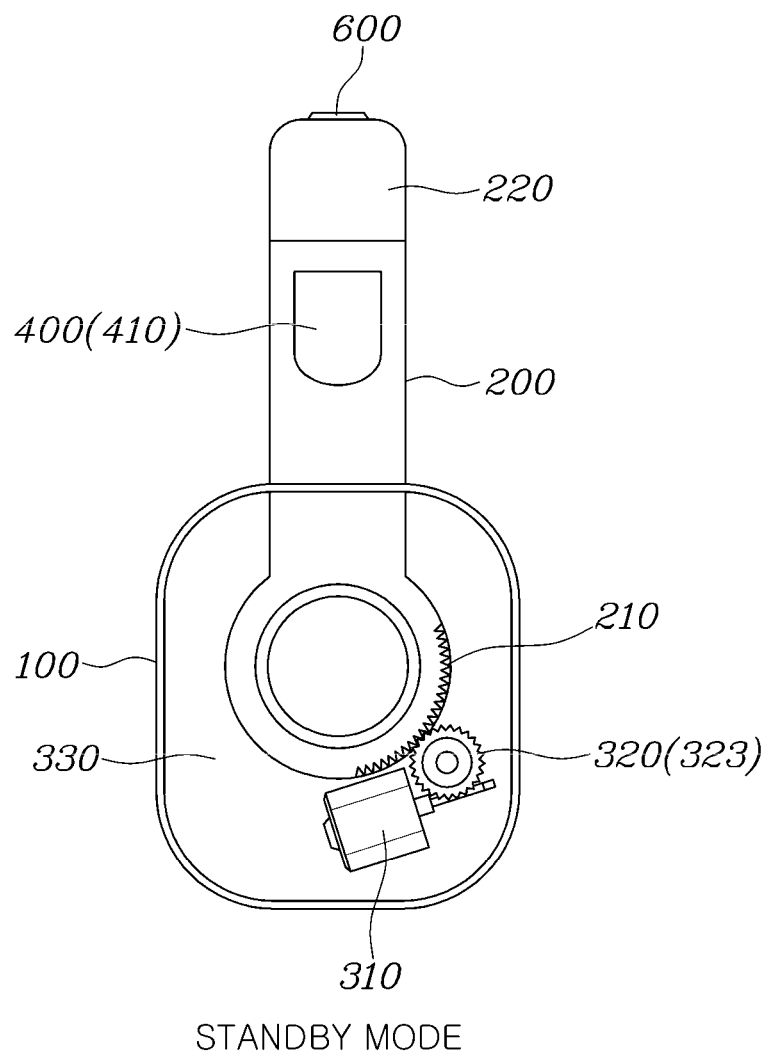

USE MODE

ELECTRONIC SHIFT CONTROL APPARATUS

CROSS REFERENCE TO RELATED APPLICATION

The present application claims priority to Korean Patent Application No. 10-2023-0018749, filed Feb. 13, 2023, the entire contents of which is incorporated herein for all purposes by this reference.

BACKGROUND OF THE PRESENT DISCLOSURE

Field of the Present Disclosure

The present disclosure relates to a column-type electronic shift control apparatus, and more particularly, to a column-type electronic shift control apparatus mounted in a rotation type on a steering column.

Description of Related Art

In general, in vehicles provided with an automatic transmission, hydraulic pressure is controlled within gear stages set for the speed of the vehicles so that gears of desired shifting stages may be automatically operated.

An automatic transmission generates gear ratios using a hydraulic circuit, a planetary gear set, and friction members to shift and a Transmission Control Unit (TCU) is in charge of control of these components.

A Shift-By-Wire (SBW) system, which is an electronic shift system for a vehicle, has no mechanical connection structure such as a cable between a transmission and a shift lever, unlike existing mechanical shift systems. In the SBW system, when a sensor value generated by operation of a shifter (a shift lever or a shift button or a shift dial) is transmitted to a Transmission Control Unit (TCU), shift control is electronically performed in response to an instruction signal from the TCU.

Accordingly, an automatic transmission based on SBW includes an advantage that shifting into a Driving (D)-stage, a Reverse (R)-stage, a Neutral (N)-stage (Nd-stage or Nr-stage), etc. is more easily performed by transmitting driver's intention to shift to a Transmission Control Unit (TCU) using an electrical signal by simply operating an electronic shifter, and has another advantage that because the shifter may be formed in a small size, a wide area may be secured between the driver seat and the passenger seat.

As a method of shifting using an electronic shift system, in a broad meaning, there are a lever type using a lever, a button type using a button, and a dial type using a dial.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a column-type electronic shift control apparatus which is mounted in a rotation type on a steering column of a vehicle and in which a shifter is positioned to extend upward in a standby mode and is positioned to extend laterally in a use mode by rotating from the standby mode ahead of the steering wheel in the visual field of a driver so that high-tech images may be provided and the commercial value may be improved.

Various aspects of the present disclosure are to provide a column-type electronic shift control apparatus configured to be able to shift by operating a shifter even in a standby mode when the shifter cannot be rotated to a use mode from a standby mode due to breakdown so that safety in shifting may be further reinforced.

To achieve the objectives of the present disclosure described above, there is provided a column-type electronic shift control apparatus including: a housing disposed ahead of a steering wheel: a shifter including a first end portion rotatably coupled to the housing and a second end portion radially protruding from the first end portion, and configured to be operated in response to an input of a driver to shift a vehicle; and a power mechanism disposed in the housing and configured to rotate the shifter when operating.

A rotation axis of the shifter and a rotation axis of the steering wheel may be disposed substantially in parallel.

A steering column may pass through both the housing and the first end portion of the shifter: the housing may be fixed to the steering column ahead of the steering wheel; and the shifter may be rotated on the steering column.

When the power mechanism is operated, the shifter may be switched to a standby mode and a use mode by rotating: the standby mode may be a position at which the shifter extends upward ahead of the steering wheel in a visual field of a driver; and the use mode may be a position at which the shifter laterally extends by rotating from the standby mode.

Switching between the standby mode and the use mode may be set at 90 degrees or less 90 degrees.

The shifter may be switched to the use mode by rotating clockwise or counterclockwise from the standby mode and may be returned to the standby mode by rotating in an opposite direction from the use mode.

When the shifter is positioned at the use mode by rotating clockwise from the standby mode, the shifter may be positioned left and right symmetrically to a turn signal switch disposed at a left with the steering wheel therebetween.

The shifter may be positioned left and right symmetrically to a turn signal switch with the steering wheel therebetween in the use mode.

The power mechanism may include: a motor fixed to the housing: a gear member configured to transmit power of the motor to the shifter; and a printed circuit board (PCB) configured to control driving of the motor.

The gear member may include a worm connected to the motor, a worm wheel engaged with the worm, and an intermediate gear coaxially connected to the worm wheel and coupled to a gear portion of the shifter; and the shifter may be self-locked by engagement of the worm and the worm wheel in the standby mode and the use mode, whereby a position of the shifter may be fixed.

A permanent magnet may be fixed to the gear member: the PCB may include a Hall sensor configured to detect rotation of the shifter based on variation of magnetic flux of the permanent magnet; and the PCB may control driving of the motor using a signal of the Hall sensor.

The shifter may include an indicator; and the indicator may display a visual information image excluding gear stages when the shifter is positioned at the standby mode, and may display gear stages of the vehicle when the shifter is positioned at the use mode.

The PCB may perform control to drive the motor when an input unit signal is input; and the input unit signal may be any one of vehicle on- and off-signals, door open and close signals, door lock and unlock signals, an autonomous driving mode change signal, and a manual driving mode change signal.

The shifter may be positioned at the standby mode in a vehicle off-state and may be positioned at the use mode in a vehicle on-state.

The shifter may be positioned at the standby mode in an autonomous driving mode and may be positioned at the use mode in a manual driving mode.

When a door open signal or a door unlock signal is generated, the shifter may be positioned at the standby mode and a welcome image may be displayed on the indicator.

When the shifter is positioned at the use mode, a driver may change gear stages by operating the shifter, and when the shifter is operated at the standby mode position, gear stages may not be changed or an N-stage shifting signal may be output for only a predetermined time period immediately after a vehicle is turned off.

The shifter may be operated by turning a shift knob on the shifter in the use mode; and when the shift knob is turned forward, a D-stage or an R-stage may be selected, when the shift knob is turned backward, the R-stage or the D-stage may be selected, and when the shift knob is turned forward or backward and then released, the shift knob may be returned to an initial position thereof.

The shifter may include a shift controller configured to select gear stages by operation of the shifter: the shift controller and the PCB may be connected to each other to transmit and receive signals through a wiring; and the shift controller may make the visual information image excluding gear stages be displayed on the indicator in the standby mode and may make the gear stages of a vehicle be displayed on the indicator in the use mode in response to signals received from the PCB.

Furthermore, an electronic shift control apparatus which is mounted on a steering wheel of a vehicle in accordance with various aspects of the present disclosure includes: a shifter configured to select gear stages of a vehicle; and a power mechanism configured to transmit power to rotate the shifter in response to a signal of an input unit, in which the shifter is positioned at a standby mode which is a mode at which the shifter extends upward or at a use mode which is a mode at which the shifter laterally extends, ahead of a steering wheel in a visual field of a driver; and the shifter is switched to the use mode by rotating clockwise or counterclockwise from the standby mode and is returned to the standby mode by rotating in an opposite direction from the use mode by operation of the power mechanism when the signal of the input unit is input.

A column-type electronic shift control apparatus according to an exemplary embodiment of the present disclosure is mounted in a rotation type on a steering column of a vehicle, in which a shifter is positioned to extend upward in a standby mode and is positioned to extend laterally in a use mode by rotating from the standby mode ahead of the steering wheel in the visual field of a driver, so there is an effect that high-tech images may be provided and the commercial value may be improved.

Furthermore, the column-type electronic shift control apparatus according to an exemplary embodiment of the present disclosure is configured to be able to shift by operating a shifter even in a standby mode when the shifter cannot be rotated into a use mode from a standby mode due to breakdown, so there is an effect that safety in shifting may be further reinforced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6A and FIG. 6B are views respectively showing the states in which the shifter is positioned at a standby mode and a use mode in accordance with various aspects of the present disclosure:

Figure 1:
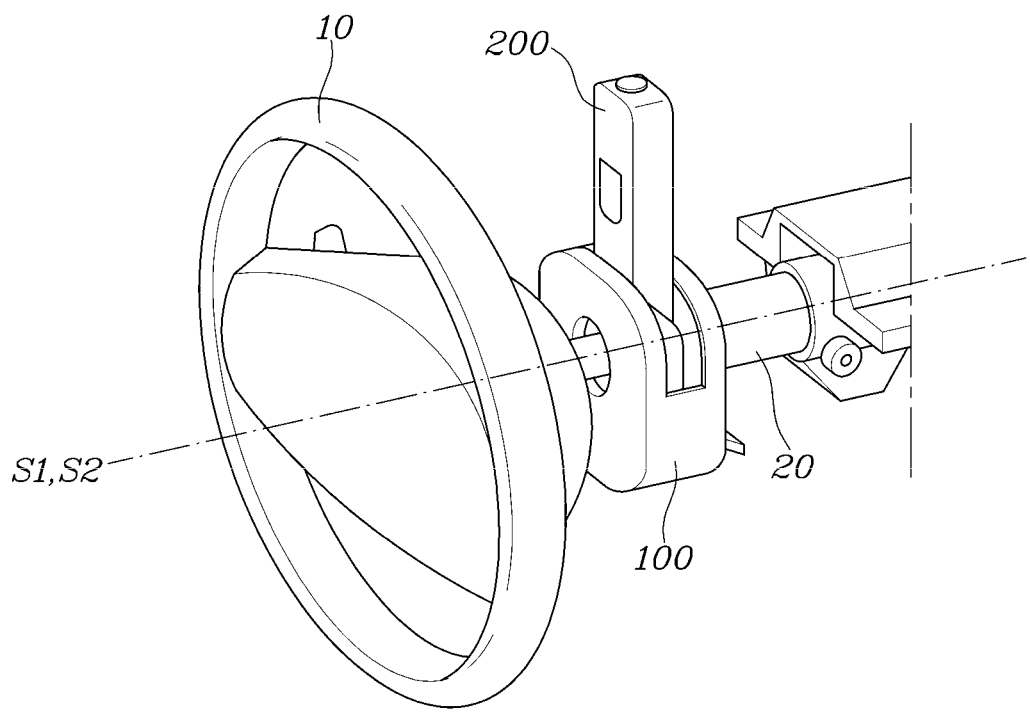
FIG. 1 is a view of a column-type electronic shift control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, embodiments of the present disclosure will be described in detail with reference to the accompanying drawings and the same or similar components are provided the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the exemplary embodiments described herein unclear, the detailed description is omitted.

Furthermore, the accompanying drawings are provided only for easy understanding of embodiments included in the specification, and the technical spirit included in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be directly connected to or directly coupled to another element or be connected to or coupled to another element, including the other element intervening therebetween.

On the other hand, it should be understood that when one element is referred to as being "directly connected to" or "coupled directly to" another element, it may be connected to or coupled to another element without the other element intervening therebetween.

Singular forms are intended to include plural forms unless the context clearly indicates otherwise.

It will be further understood that the terms "comprise" or "have" used in the present specification, specify the presence of stated features, steps, operations, components, parts, or a combination thereof, but do not preclude the presence or addition of one or more other features, numerals, steps, operations, components, parts, or a combination thereof.

A unit or a control unit included in names such as a Motor Control Unit (MCU) and a Hybrid Control Unit (HCU) is only a term which is generally used to name a controller that is configured to control specific functions of a vehicle rather than meaning a generic function unit.

A controller may include a communication device that communicates with another controller or a sensor to control corresponding functions, a memory that stores an operating system or logic commands and input/output information, and one or more processors that perform calculation, determination, decision, etc. For controlling the corresponding functions.

A column-type electronic shift control apparatus according to exemplary embodiments of the present disclosure is described hereafter in detail with reference to the accompanying drawings.

A column-type electronic shift control apparatus according to various exemplary embodiments of the present disclosure, as shown in FIG. 1, FIG. 2, FIG. 3, FIG. 4, FIG. 5, FIG. 6, FIG. 7, and FIG. 8, includes: a housing 100 disposed ahead of a steering wheel 10; a shifter 200 including a first end portion rotatably coupled to the housing 100 and a second end portion radially protruding, and operated by a driver to shift a vehicle; and a power mechanism 300 disposed in the housing 100 and rotating the shifter 200 when operating.

Various exemplary embodiments of the present disclosure includes a configuration in which the shifter 200 which is operated by a driver to shift is disposed at the steering wheel 10 in a vehicle, and includes an advantage that there is no demand for providing a specific space for mounting the shifter 200.

The present disclosure is characterized in that a rotation axis S1 of the shifter 200 and a rotation axis S2 of the steering wheel 10 are disposed substantially in parallel. That is, various exemplary embodiments of the present disclosure includes a structure in which a steering column 20 passes through both the housing 100 and the first end portion of the shifter 200, the housing 100 is fixed to the steering column 20 ahead of the steering wheel 10, and the shifter 200 is rotated on the steering column 20.

In the case in which the steering column 20 passes through the first end portion of the shifter 200 and the shifter 200 may be rotated with respect to the steering column 20, as described above, the rotation axis S1 of the shifter 200 and the rotation axis S2 of the steering wheel 10 are substantially the steering column 20, and in the instant case, the external size may be reduced.

As an exemplary embodiment of the present disclosure, a structure in which the steering column 20 does not pass through the first end portion of the shifter 200 and the shifter 200 is disposed outside the steering column 20 is possible. For example, the rotation axis S1 of the shifter 200 and the rotation axis S2 of the steering wheel 10 may be spaced apart and substantially parallel with each other, and the present case has an advantage that it is possible to increase the degree of free designing because the shifter 200 may be provided at various positions, when necessary.

When the power mechanism 300 is operated, the shifter 200 is rotated on the steering column 20 and may be switched to a standby mode and a use mode when rotating.

Figure 6B:
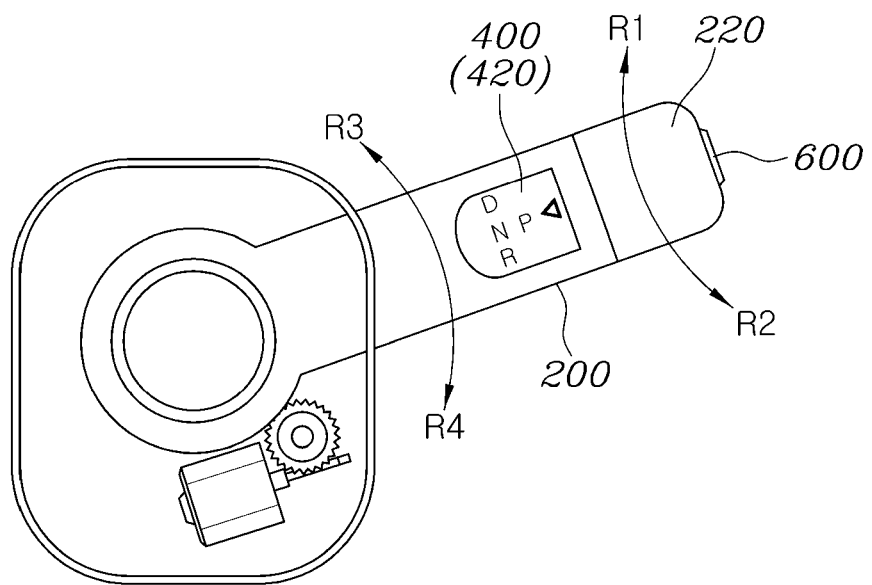

FIG. 6A is the state in which the shifter 200 is positioned at the standby mode and FIG. 6B is the state in which the shifter 200 is positioned at the use mode.

The standby mode may be defined as a position at which the shifter 200 extends upward ahead of the steering wheel 10 in the visual field of a driver and the use mode may be defined as a position at which the shifter 200 laterally extends by rotating from the standby mode.

For example, the standby mode may be a position at which the shifter 200 extends in the direction of twelve o'clock and the use mode may be a position at which the shifter 200 extends in the direction of two o'clock or the direction of ten o'clock.

The standby mode and the use mode of the shifter 200 may be switched by operation of the power mechanism, and switching from the standby mode to the use mode may be set at 90 degrees or less 90 degrees.

When switching from the standby mode to the use mode of the shifter 200 is set at 90 degree or more and the shifter 200 is positioned over the direction three o'clock or before the direction of nine o'clock in the use mode, a knee of a driver may be interfered with by coming in contact with the shifter 200 at the position of the use mode. Accordingly, switching from the standby mode to the use mode of the shifter 200 may be set at 90 degree or less.

The shifter 200 is switched to the use mode from the standby mode by rotating clockwise or counterclockwise by operation of the power mechanism 300 and is returned to the standby mode by rotating in the opposite direction from the use mode.

That is, when the power mechanism 300 is operated, the shifter 200 may be switched to the use mode in the direction of two o'clock by rotating clockwise from the position of the standby mode in which the shifter 200 extends in the direction of twelve o'clock, or when the power mechanism 300 is operated, the shifter 200 may be switched to the use mode in the direction of ten o'clock by rotating in the opposite direction from the position of the standby mode in the direction of twelve o'clock.

Furthermore, the shifter 200 in the use mode may be returned to the position of the standby mode in the direction of twelve o'clock by rotating in the opposite direction by operation of the power mechanism 300.

Figure 7:
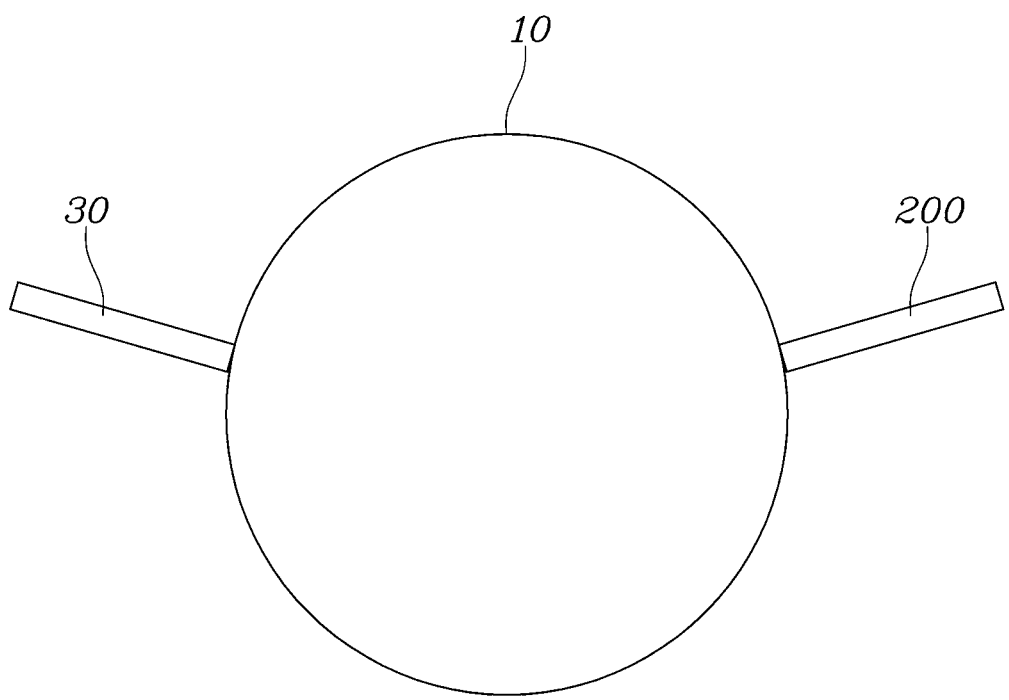
FIG. 7 is a view showing the state in which the shifter is positioned left and right symmetrically to a turn signal switch in the use mode in accordance with various aspects of the present disclosure.

When the shifter 200 is positioned at the use mode by rotating clockwise from the standby mode, as in FIG. 7, the shifter 200 may be positioned left and right symmetrically to a turn signal switch 30 disposed at the left with the steering wheel 10 therebetween, and accordingly, a driver can more easily operate the shifter 200.

The power mechanism 300 that rotates the shifter 200 includes: a motor 310 fixed to the housing 100: a gear member 320 that transmits power of the motor 310 to the shifter 200; and a Printed Circuit Board (PCB) 330 that is configured to control driving of the motor 310.

The motor 310 may be a bidirectional motor that can rotate the shifter 200 both clockwise and counterclockwise.

The gear member 320 includes a worm 321 connected to the motor 310, a worm wheel 322 engaged with the worm 321, and an intermediate gear 323 coaxially connected to the worm wheel 322, and the shifter 200 is characterized in that it is self-locked and its position is fixed in the standby mode and the use mode by engagement of the worm 321 and the work wheel 322.

Self-locking means that the position of the shifter 200 is fixed in the standby mode or the use mode by engagement of the worm 321 and the worm wheel 322 even though power which is transmitted to the motor 310 is cut, and accordingly, there is an advantage that there is no demand for a specific stopper for fixing the position of the shifter 200.

A gear portion 210 is formed on the external surface of the first end portion of the shifter 200, the intermediate gear 323 and the gear portion 210 are engaged with each other, and rotation of the intermediate gear 323 is transmitted to the gear portion 210, whereby the shifter 200 is rotated.

The intermediate gear 323 shares a shaft with the worm wheel 322 and may be a spur gear or a spiral gear.

Figure 2:
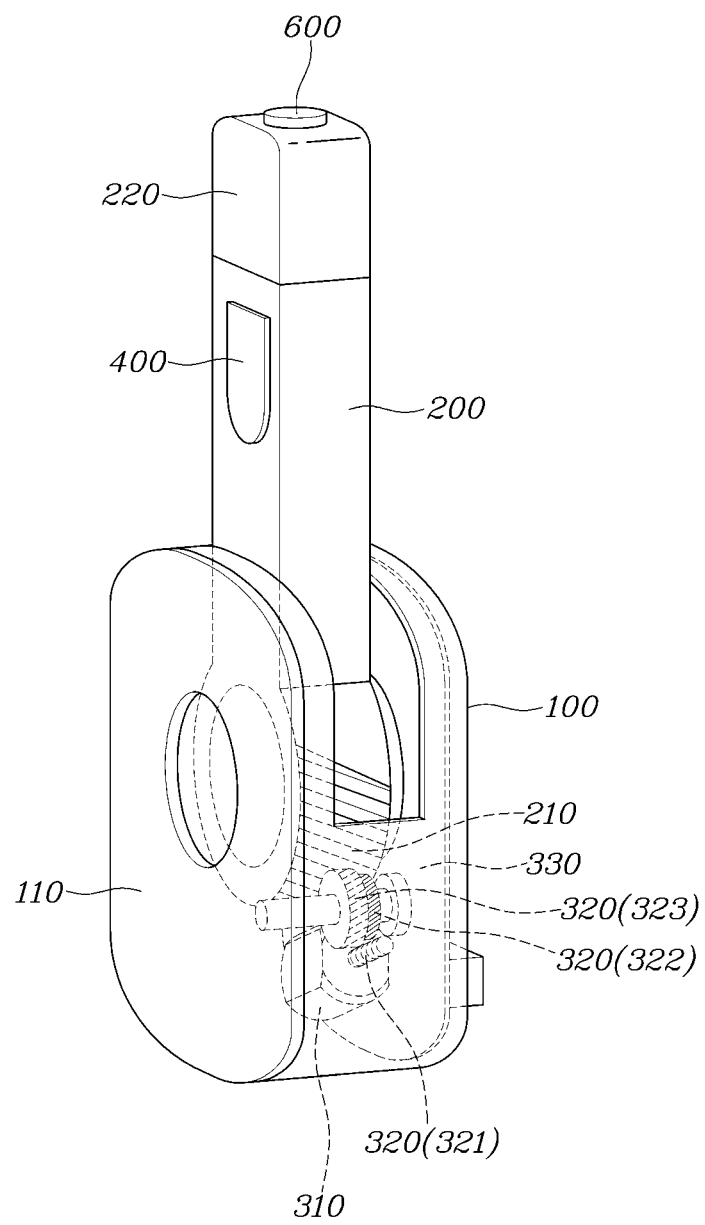
FIG. 2 is a view showing only the control apparatus according to an exemplary embodiment of the present disclosure separated from the apparatus shown in FIG. 1.
Figure 3:
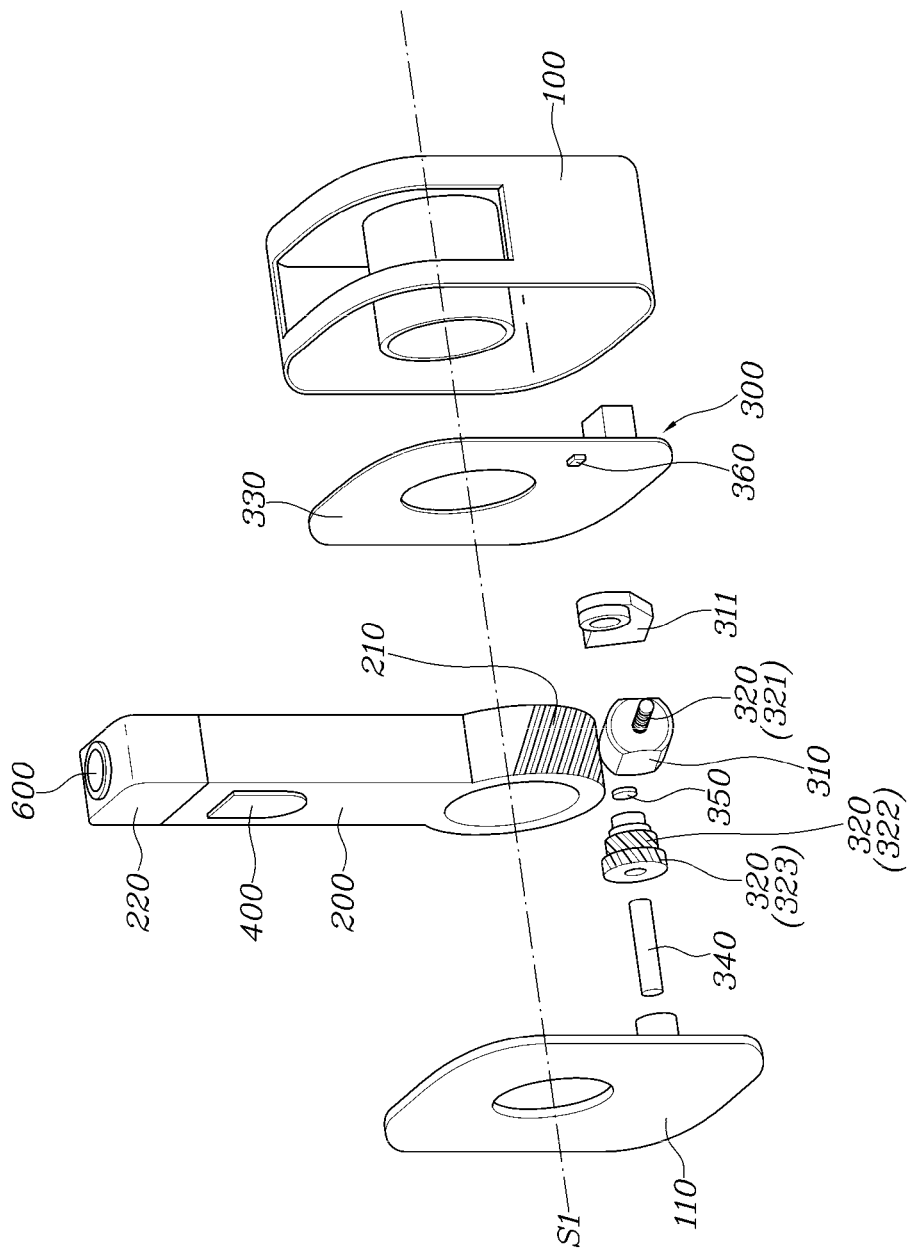
FIG. 3 and FIG. 4 are exploded views of the column-type electronic shift control apparatus according to an exemplary embodiment of the present disclosure.
Figure 4:
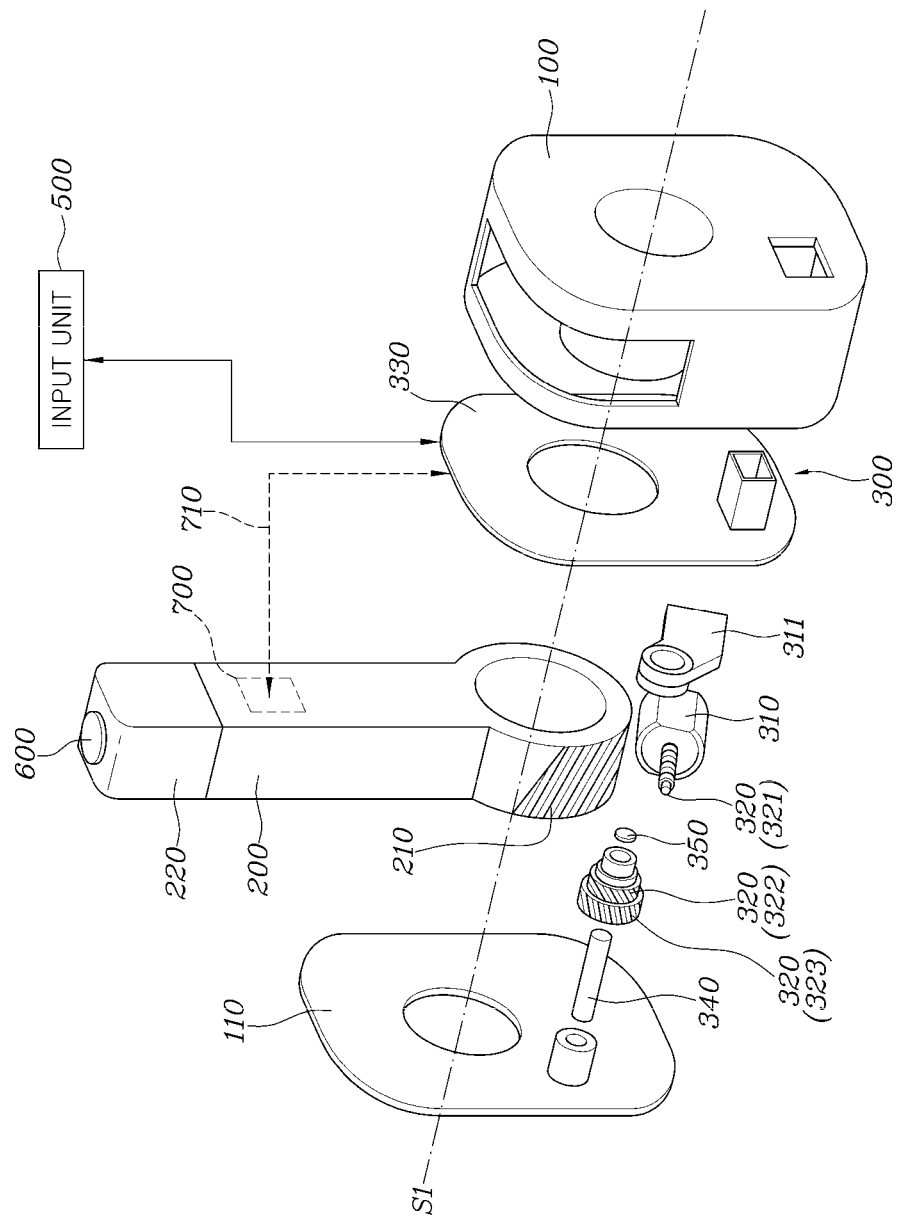
Figure 5:
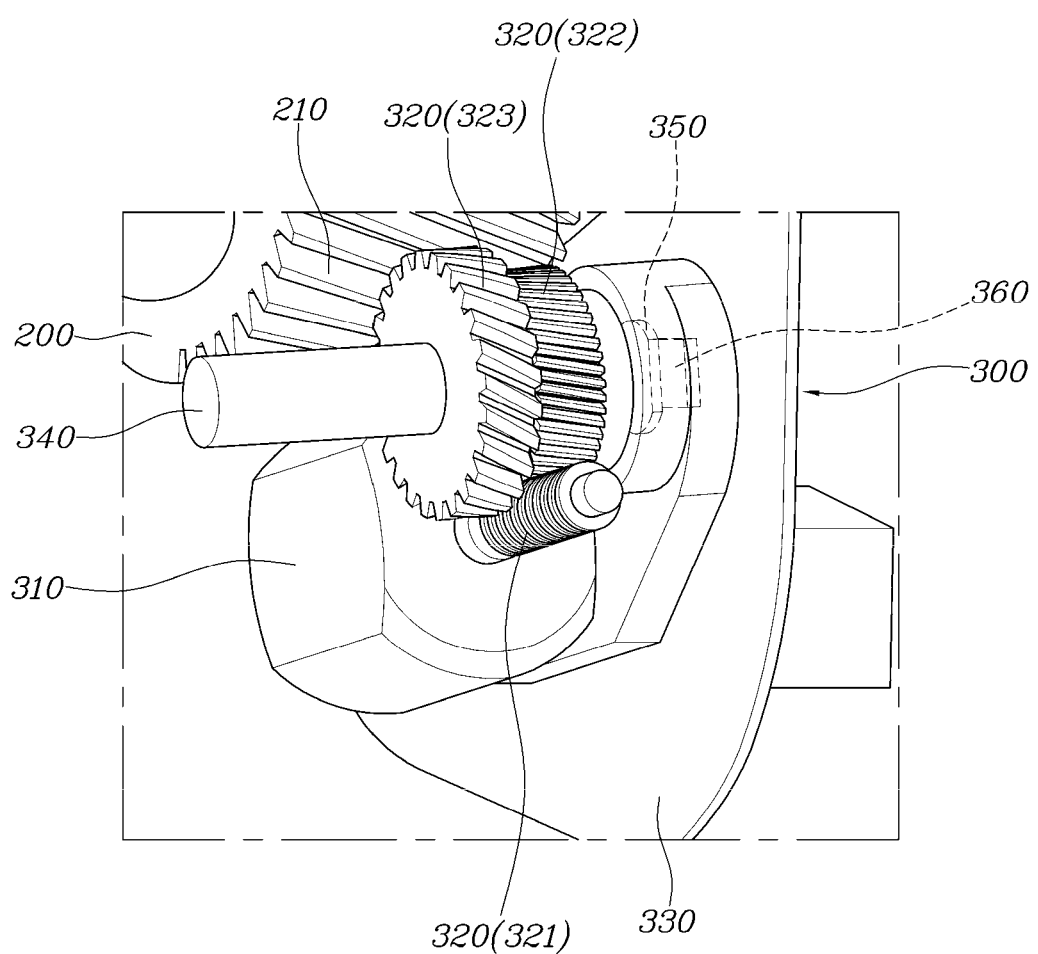
FIG. 5 is a view exemplarily illustrating a power mechanism according to an exemplary embodiment of the present disclosure.

In FIG. 2 and FIG. 3, reference numeral 110 indicates a housing cover, reference numeral 311 indicates a motor support, and reference numeral 340 indicates a gear shaft.

The motor support 311 is provided to be fixed to the housing 100 and the motor 310 is coupled to be fixed to the motor support 311.

A first end portion of the gear shaft 340 is fixed to the housing cover 110 and a second end portion of the gear shaft 340 passes through the center portion of the worm wheel 322, and the worm wheel 322 is rotated on the gear shaft 340.

A permanent magnet 350 is fixed to the gear member 320, the PCB 330 includes a Hall sensor 360 which is configured to detect rotation of the shifter 200 based on variation of magnetic flux of the permanent magnet 350 due to rotation of the gear member 320, and the PCB 330 is configured to control driving of the motor 320 using a signal of the Hall sensor 360.

The PCB 330 detects the position of the shifter 200 using a signal of the Hall sensor 360, whereby it is possible to know whether the shifter 200 is correctly positioned at the position of the standby mode or the use mode.

Furthermore, the PCB 330 is configured to control rotation of the shifter 200 by controlling driving of the motor 310, whereby the shifter 200 may be rotated to the use mode from the standby mode or to the standby mode from the use mode.

Furthermore, the Hall sensor 360 may be used for fail safe (breakdown control) when the shifter 200 is not correctly positioned at the position of the standby mode or the use mode.

According to an exemplary embodiment of the present disclosure, the shifter 200 includes an indicator 400.

A visual information image 410 excluding gear stages may be displayed on the indicator 400 when the shifter 200 is positioned at the standby mode, as in FIG. 6A, and gear stages 420 of a vehicle may be displayed on the indicator 300 when the shifter 200 is positioned at the use mode, as in FIG. 6B.

Figure 8:
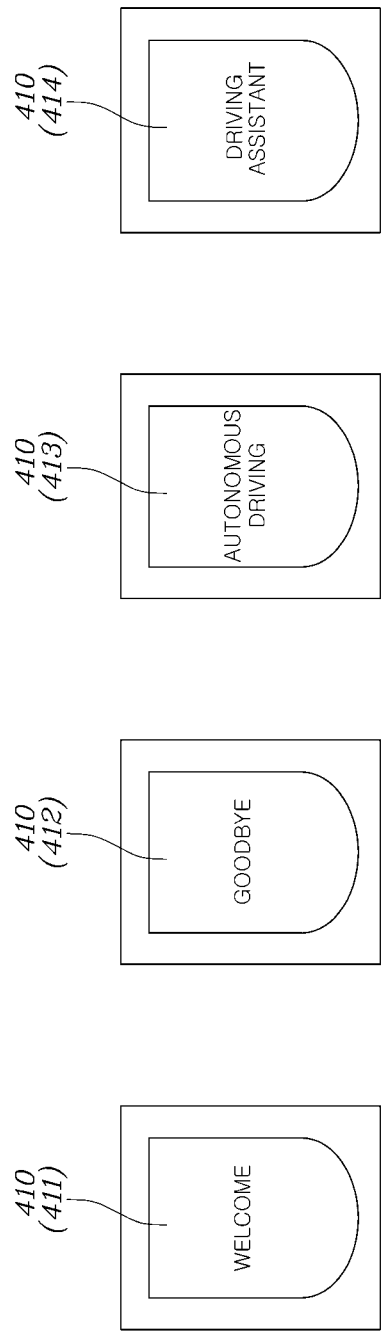
FIG. 8 is a view exemplarily illustrating visual information images that are displayed on an indicator in accordance with various aspects of the present disclosure.

The gear stages 420 of a vehicle that are displayed on the indicator 400 may be a D-stage, an N-stage, an R-stage, and a P-stage, and the visual information image 410 excluding gear stages, as shown in FIG. 8, may include any at least one of a welcome image 411, a goodbye image 412, an autonomous driving activation image 413, and a driving assistant system activation image 414.

The welcome image 411 is an image which is visually displayed when a driver gets in a vehicle, the goodbye image 412 is an image which is displayed when a driver get off a vehicle, the autonomous driving activation image 413 is an image that visually shows an autonomous driving activation state, and the driving assistant system activation image is an image that visually shows an activation state of a driving assistant system such as an ADAS (Advanced Driver Assistance System).

As described above, the current condition of a vehicle is displayed as a visual image on the indicator 400 and is provided to a driver under various conditions, whereby a commercial value may be improved.

Because the standby mode is a mode at which the shifter 200 extends upward, the shifter 200 is positioned at the front that a driver looks at when the driver gets in a vehicle, so that the visual image 410 excluding gear stages may be easily transmitted to the driver and an aesthetic sense may be aroused.

Because the use mode is a mode at which the shifter 200 laterally extends, when the shifter 200 is positioned at the use mode, a driver can easily hold the shifter 200 by hand and can more easily change gear stages.

The PCB 330 according to an exemplary embodiment of the present disclosure is configured to control the motor 310 to open when a signal is input through an input unit 500 and the signal from the input unit 500 is any one of vehicle on- and off-signals, door open and close signals, door lock and unlock signals, an autonomous driving mode change signal, and a manual driving mode change signal.

The vehicle on-signal of the signals from the input unit 500 includes a drivable state (EV ready) when the vehicle is an electric vehicle, whereby a driver can clearly recognize whether the electric vehicle is in the on-state.

The shifter 200 is positioned at the standby mode when a vehicle is in the off-state, and is positioned at the use mode when a vehicle is in the on-state, so it is possible to clearly recognize whether an electric vehicle is in the on-state based on the position change of the shifter 200.

Furthermore, the shifter 200 is positioned at the standby mode when a vehicle is in an autonomous driving mode, and is positioned at the use mode when a vehicle is in a manual driving mode.

It is assumed that a vehicle is in the on-state in the situation of the autonomous driving mode or the manual driving mode of the vehicle.

In an autonomous driving mode, a vehicle is being driven but the shifter 200 is positioned at the standby mode in the direction of twelve o'clock, and in the instant case, the autonomous driving activation image 413 is displayed on the indicator 400, so recognizability of the autonomous driving mode is improved.

When a door open signal or a door unlock signal is generated, the shifter 200 is positioned at the standby mode and the welcome image 411 is displayed on the indicator 400.

In a door open condition, the welcome image 411 is displayed on the indicator 400, whereby a satisfactory aesthetic sense may be provided to a driver.

The shifter 200 should be switched between the use mode and the standby mode, depending on signals from the input unit 500, and for example, the shifter 200 may be positioned at the standby mode when a door open signal is generated, and may be positioned at the use mode when a door close signal is generated.

Furthermore, the shifter 200 may be positioned at the standby mode when a door unlock signal is generated, and may be positioned at the use mode when a door lock signal is generated.

When the shifter 200 is positioned at the use mode, a driver can change gear stages by operating the shifter 200, and when the shifter 200 is operated at the standby mode position, gear stages cannot be changed or an N-stage shifting signal may be output for only a predetermined time period immediately after a vehicle is turned off.

In a manual driving mode situation, the shifter 200 is positioned at the use mode and a driver can change gear stages by operating the shifter 200.

A vehicle is in the off-state or is in an autonomous driving mode situation when the shifter 200 is positioned at the standby mode, so, in the instant case, gear stages are not changed for safety even though a driver operates the shifter 200.

Exceptionally, to park a vehicle in the N-stage, it may be possible to output an N-stage shifting signal for only a predetermined time period immediately after a vehicle is turned off when the shifter 200 is operated.

When the shifter 200 is positioned at the use mode, as in FIG. 6B, a driver can change gear stages by turning a shift knob 220 of the shifter 200.

That is, when a driver turns the shift knob 220 forward (in the direction of an arrow R1), a D-stage or an R-stage is selected, when a driver turns the shift knob 220 backward (in the direction of an arrow R2), the R-stage or the D-stage is selected, and when a driver turns the shift knob 220 forward or backward and then releases the shift knob 220, the shift knob 220 is returned to the initial position by a restoring force of an elastic member such as a spring. The initial position, for example, may be a Null stage at which a specific signal is not generated.

As an exemplary embodiment of the present disclosure, it may be possible to change gear stages by rotating the shifter 200 itself in the use mode.

That is, when a driver rotates the shifter 200 itself upward (in the direction of an arrow R3), a D-stage or an R-stage is selected, when a driver rotates the shifter 200 itself downward (in the direction of an arrow R4), the R-stage or the D-stage is selected, and when a driver rotates the shifter 200 upward or downward and then releases the shifter 200, the shifter 200 is returned to the initial position by a restoring force of an elastic member such as a spring.

Furthermore, according to an exemplary embodiment of the present disclosure, a P-stage button 600 is separately disposed at the end portion of the shifter 200, so it is possible to park a vehicle by operating the P-stage button 600.

The shifter 200 according to an exemplary embodiment of the present disclosure may include a shift controller 700 that detects a change of gear stages by operation of the shifter.

The shift controller 700 is disposed and fixed in the shifter 200, the shift controller 700 and the PCB 330 are connected to each other to transmit and receive signals through a wiring 710, and the shift controller 700 can make the visual information image 410 excluding gear stages be displayed on the indicator 400 in the standby mode and can make the gear stages 420 of a vehicle be displayed on the indicator in the use mode in response to signals received from the PCB 330.

That is, when a driver operates the shift knob 220, the shift controller 770 detects a change of gear stages and transmits gear stage change information to the PCB 330 and the PCB 330 transmits the present information to a vehicle controller, whereby shifting is finished. Furthermore, the vehicle controller is configured to transmit a shift finishing signal to the PCB 330 in consideration of shift conditions, the PCB 330 transmits shift finishing information back to the shift controller 700, and finally, the information of a changed gear stage 420 is displayed on the indicator 400 by the shift controller 700.

It may be possible to define a configuration in which the PCB 330 in the housing 100 is a main PCB, the shift controller 700 in the shifter 200 is an assistant PCB, and the main PCB and the assistant PCB are electrically connected to each other through the wiring 710.

The present disclosure, which relates to a column-type electronic shift control apparatus which is mounted on a steering column 20 of a vehicle, is characterized by including: a shifter 200 selecting gear stages of a vehicle; and a power mechanism 300 transmitting power to rotate the shifter 200 in response to a signal from an input unit 500, and is characterized in that the shifter 200 is positioned at a standby mode which is a mode at which the shifter 200 extends upward or is positioned at a use mode which is a mode at which the shifter 200 laterally extends in the visual field of a driver ahead of a steering wheel 10, and the shifter 200 is switched to the use mode from the standby mode by rotating clockwise or counterclockwise and is returned to the standby mode from the use mode by rotating in the opposite direction by operation of the power mechanism 300 when signals are input from an input unit 500.

As described above, because the column-type electronic shift control apparatus according to an exemplary embodiment of the present disclosure is mounted in a rotation type on the steering wheel 20 of a vehicle so that the shifter 200 is positioned to extend upward in the standby mode and is positioned to extend laterally in the use mode by rotating from the standby mode in the visual field of a driver ahead of the steering wheel 10, high-tech images may be provided, so there is an advantage that the commercial value may be improved.

Furthermore, because the column-type electronic shift control apparatus is configured to be able to shift by operating the shifter 200 even in the standby mode when the shifter 200 cannot be rotated to a use mode from a standby mode due to breakdown, there is an advantage that safety in shifting may be further reinforced.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electronic shift control apparatus comprising:
   a housing disposed ahead of a steering wheel;
   a shifter including a first end portion rotatably coupled to the housing and a second end portion radially protruding from the first end portion, and configured to be operated in response to an input of a driver to shift a vehicle; and
   a power mechanism disposed in the housing and configured to rotate the shifter when operating,
   wherein a steering column passes through the housing and the first end portion of the shifter,
   wherein the housing is fixed to the steering column ahead of the steering wheel, and
   wherein the shifter is rotated on the steering column.

2. The electronic shift control apparatus of claim 1, wherein a rotation axis of the shifter and a rotation axis of the steering wheel are disposed substantially in parallel.

3. The electronic shift control apparatus of claim 1,
   wherein when the power mechanism is operated, the shifter is switched to a standby mode and a use mode by rotating thereof,
   wherein the standby mode is a mode at which the shifter extends upward ahead of the steering wheel in a visual field of the driver, and
   wherein the use mode is a mode at which the shifter laterally extends by rotating from the standby mode.

4. The electronic shift control apparatus of claim 3, wherein switching between the standby mode and the use mode is set at 90 degrees or less 90 degrees.

5. The electronic shift control apparatus of claim 3, wherein the shifter is switched to the use mode by rotating clockwise or counterclockwise from the standby mode and is returned to the standby mode by rotating in an opposite direction from the use mode.

6. The electronic shift control apparatus of claim 3, wherein when the shifter is positioned at the use mode by rotating clockwise from the standby mode, the shifter is positioned left and right symmetrically to a turn signal switch disposed at a left with the steering wheel therebetween.

7. The electronic shift control apparatus of claim 3, wherein the shifter is positioned left and right symmetrically to a turn signal switch with the steering wheel therebetween in the use mode.

8. The electronic shift control apparatus of claim 3, wherein the power mechanism includes:
a motor fixed to the housing;
a gear member configured to transmit power of the motor to the shifter; and
a printed circuit board (PCB) configured to control driving of the motor.

9. The electronic shift control apparatus of claim 8, wherein the gear member includes a worm connected to the motor, a worm wheel engaged with the worm, and an intermediate gear coaxially connected to the worm wheel and coupled to a gear portion of the shifter, and
wherein the shifter is self-locked by engagement of the worm and the worm wheel in the standby mode and the use mode, whereby a position of the shifter is fixed.

10. The electronic shift control apparatus of claim 8, wherein a permanent magnet is fixed to the gear member,
wherein the PCB includes a Hall sensor configured to detect rotation of the shifter based on variation of magnetic flux of the permanent magnet, and
wherein the PCB is configured to control driving of the motor using a signal of the Hall sensor.

11. The electronic shift control apparatus of claim 8, wherein the shifter includes an indicator, and
wherein the indicator is configured to display a visual information image excluding gear stages when the shifter is positioned at the standby mode, and to display gear stages of the vehicle when the shifter is positioned at the use mode.

12. The electronic shift control apparatus of claim 11, wherein the PCB is configured to perform control to drive the motor when an input unit signal is input thereto, and
wherein the input unit signal is one of vehicle on- and off-signals, door open and close signals, door lock and unlock signals, an autonomous driving mode change signal, and a manual driving mode change signal.

13. The electronic shift control apparatus of claim 12, wherein the shifter is positioned at the standby mode in a vehicle off-state and is positioned at the use mode in a vehicle on-state.

14. The electronic shift control apparatus of claim 12, wherein the shifter is positioned at the standby mode in an autonomous driving mode and is positioned at the use mode in a manual driving mode.

15. The electronic shift control apparatus of claim 12, wherein when a door open signal or a door unlock signal is generated, the shifter is positioned at the standby mode and a welcome image is displayed on the indicator.

16. The electronic shift control apparatus of claim 3, wherein when the shifter is positioned at the use mode, gear stages are changeable by operating the shifter, and when the shifter is operated at the standby mode, the gear stages cannot be changed or an N-stage shifting signal can be output for only a predetermined time period after the vehicle is turned off.

17. The electronic shift control apparatus of claim 3, wherein the shifter can be operated by turning a shift knob on the shifter in the use mode,
wherein when the shift knob is turned forward, a D-stage or an R-stage is selected, and
wherein when the shift knob is turned backward, the R-stage or the D-stage is selected, and
wherein when the shift knob is turned forward or backward and then released, the shift knob is returned to an initial position thereof.

18. The electronic shift control apparatus of claim 11, wherein the shifter includes a shift controller configured to select the gear stages by operation of the shifter,
wherein the shift controller and the PCB are connected to each other to transmit and receive signals through a wiring, and
wherein the shift controller is configured to make the visual information image excluding the gear stages be displayed on the indicator in the standby mode and to make the gear stages of the vehicle be displayed on the indicator in the use mode in response to signals received from the PCB.

19. An electronic shift control apparatus mounted on a steering wheel of a vehicle, the electronic shift control apparatus comprising:
a shifter configured to select gear stages of a vehicle; and
a power mechanism configured to transmit power to rotate the shifter in response to a signal of an input unit,
wherein the shifter is positioned at a standby mode which is a mode at which the shifter extends upward or at a use mode which is a mode at which the shifter laterally extends, ahead of the steering wheel in a visual field of a driver, and
wherein the shifter is switched to the use mode by rotating clockwise or counterclockwise from the standby mode and is returned to the standby mode by rotating in an opposite direction from the use mode by operation of the power mechanism when the signal of the input unit is input.

20. An electronic shift control apparatus comprising:
a housing disposed ahead of a steering wheel;
a shifter including a first end portion rotatably coupled to the housing and a second end portion radially protruding from the first end portion, and configured to be operated in response to an input of a driver to shift a vehicle; and
a power mechanism disposed in the housing and configured to rotate the shifter when operating,
wherein when the power mechanism is operated, the shifter is switched to a standby mode and a use mode by rotating thereof,
wherein the standby mode is a mode at which the shifter extends upward ahead of the steering wheel in a visual field of the driver, and
wherein the use mode is a mode at which the shifter laterally extends by rotating from the standby mode.

* * * * *